Nov. 28, 1961   W. W. KENYON   3,010,583
FLUID SAMPLING DEVICE
Filed Oct. 23, 1959

*INVENTOR.*
WALTER W. KENYON
BY KENWAY, JENNEY, WITTER & HILDRETH
ATTORNEYS

United States Patent Office 3,010,583
Patented Nov. 28, 1961

3,010,583
FLUID SAMPLING DEVICE
Walter W. Kenyon, Needham, Mass., assignor to Millipore Filter Corporation, Watertown, Mass., a corporation of Massachusetts
Filed Oct. 23, 1959, Ser. No. 848,261
5 Claims. (Cl. 210—406)

The present invention relates to the sampling of fluid for the determination of solid contaminants and provides a sampling device for collecting and simultaneously filtering the sample to collect the contaminants preliminary to analysis. The invention is particularly suited for the sampling of liquids in pressurized systems.

Systems employing fluids under pressure have come into wide use in such fields as hydraulic control systems in navigational equipment and other precision machinery, in the fuel systems for jet and turbo-jet engines, and in the heat transfer systems of nuclear power installations. In installations such as these, it is important that the fluid be free from excessive solid contaminants, and it is common practice to provide for periodic sampling of the fluid to determine regularly the extent of contamination. Heretofore it has ben common practice to collect a sample of fluid from the system in a suitable container and ship it to a laboratory for analysis. That practice suffers from the disadvantage that the fluid is exposed to the atmosphere as the sample is collected in and removed from the container, and is also exposed to contamination if the container is not absolutely clean. Shipment of the entire sample is also inconvenient.

The sampling devices of this invention provide for the immediate filtration of the sample as it is collected from the pressurized system. In collecting the sample, there is no exposure to the atmosphere nor contact with any container. The common sources of contamination are thus eliminated. The invention moreover utilizes an enclosed filtration unit within which the solid contaminants are filtered from the fluid and which may then be closed and sent to the laboratory for analysis. Shipment of the entire collected sample is thereby avoided and only the relatively small filtration unit with the collected solid contaminants is sent out for analysis.

The filtration unit associated with the sampling device of this invention is typically a light transparent plastic covered dish construction having inlet and outlet ports and containing a filter film arranged within it for filtration. The sampling device features a housing for holding the filtration unit in assembled relation under the pressure of the fluid being sampled and for providing the connections for introducing and removing the fluid from the filtration unit.

The sampling device of this invention thus consists in an assembly containing the filtration unit, and having an inlet conduit for making direct connection with the system cnotaining the fluid to be sampled. A sample of measured quantity may accordingly be withdrawn without exposure to the atmosphere and be simultaneously filtered. After the desired quantity is taken, the residual fluid in the inlet conduit and in the filter may be drawn through by application of a partial vacuum at the outlet side of the device.

The invention is described in detail below with reference to the accompanying drawing in which.

Figure 1:
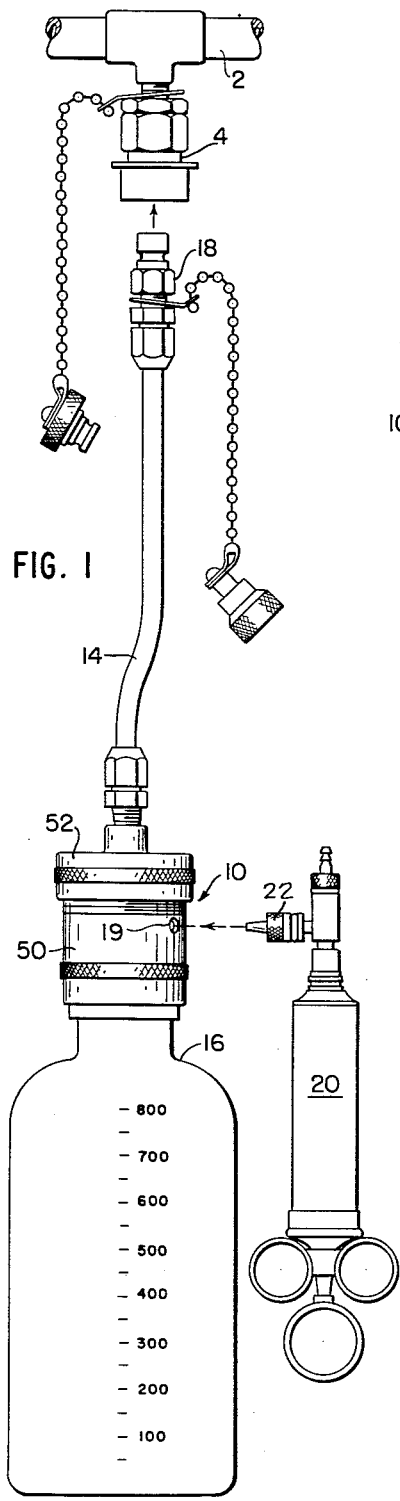
FIG. 1 is a side elevation showing the sampling device as it is about to be connected into a fluid-containing system.
Figure 2:
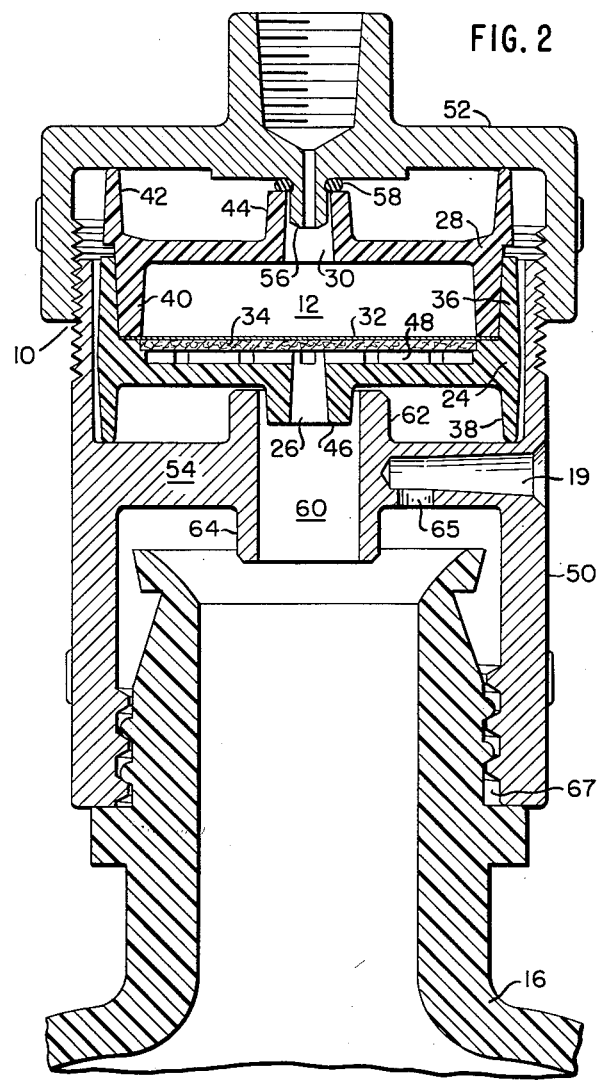
FIG. 2 is a view in longitudinal section showing the construction of the sampling device.

In general the sampling device of this invention consists primarily in a housing 10 containing a filtration unit 12 and providing the necessary connections for filtration. The housing 10 holds the filtration unit 12 tightly enclosed and provides both inlet and outlet connections. The inlet connection connects with an inlet conduit 14 which provides for the withdrawal of fluid from under pressure and the outlet connection leads to a receptacle 16 or to other means for collecting filtrate.

The preferred embodiment of the invention illustrated in the drawings is shown with reference to the collection of a sample of fluid from a pipeline 2 into which is connected a standard quick-coupling connection 4. The inlet conduit 14 terminates in a complementary fitting 18 adapted to mate with the connection 4.

In taking a sample for analysis the fitting is joined with the connection 4 and a measured quantity of fluid is then collected in the receptacle 16. In flowing through the housing 10 the fluid is passed through the filtration unit 12 and the solid impurities are removed. A vent 19 in the side of the housing 10 permits the escape of air from the container as the fluid enters, and provides a port through which a vacuum may be drawn to cause the fluid remaining within the tube 14, after disconnection of the fitting 18, to be drained through the filter and into the receptacle 16. A syringe 20, having a vacuum connection 22, is conveniently utilized for this purpose.

The filtration unit 12 is typically formed of a bottom dish 24 having a drainage port 26 and a close fitting cover 28 having an inlet port 30, and contains a microporous filter film 32 arranged for filtration between the inlet and outlet ports. The filter film is conveniently supported on a porous member 34 which provides for drainage of filtrate from beneath the filter film.

The bottom dish 24 is preferably molded from a transparent plastic and is formed with an upright circular wall 36 and a downwardly depending base flange 38. The cover 28 is similarly formed of a transparent plastic and includes a downwardly extending side wall 40 frictionally engaging the upright wall 36. The top edge of the cover is formed with an upwardly extending top flange 42. The inlet port 30 and outlet port 26 are formed respectively within an upwardly extending collar 44 in the cover member 28 and a downwardly extending collar 46 in the bottom dish 24. The filter film 32 is engaged at its marginal edges between the dish 24 and cover 28, and the bottom of the dish 24 is conveniently provided with interconnecting radial and annular channels 48 which communicate with the outlet port 26 and provide for the uniform collection of filtrate from beneath the porous members 34.

The housing 10 serves to hold the filtration unit 12 during the collection of the sample and to provide inlet and outlet connections for filtration. The housing 10 consists in general of a shell 50 and cap 52 in which the filter unit is contained. The base flange 38 of the filter dish 24 is supported on a partition 54 extending across the inside of the shell 50, and the upper flange 42 of the cover is engaged by the inside top surface of the cap 52. A threaded engagement of the cap 52 with the shell 50 permits the filtration unit to be engaged within the housing under pressure sufficient to hold it in tight assembled relationship.

Connection with the inlet port 30 is provided by a hollow projection 56 formed in the cover and communicating with the inlet conduit 14, and a generally cylindrical gasket 58 surrounding the base of the projection 56 assures a tight connection. Filtrate from the outlet port 26 is collected in a drain 60 formed within the partition 54 and defined at its upper end by an upwardly extending channel wall 62 surrounding the outlet port collar 46. The lower portion of the drain 60 is formed within a lower channel wall 64 projecting downwardly from the partition 54 to direct the filtrate into the lower drainage portion of the shell 50. The vent 19 extends inwardly from the outer wall of the shell 50 through the partition 54 and terminates in a vent port 65 located in the lower wall of the partition 54 beside the lower portion of the drain 60. The location of the port 65 permits the escape of displaced air without entrainment of incoming fluid, with the lower portion 64 of the drain 60 serving to separate the outgoing air from the incoming fluid.

The lower drainage portion of the shell 50 provides for the collection of fluid as it drains from the filter unit and comprises a threaded neck 67 to which the neck of the container 16 may be threaded. The drainage region enclosed within the neck 67 permits the drawing of a partial vacuum through the vent 19 by which the residual fluid within the tube 14, and also within the filter unit, may be withdrawn at the end of each sampling.

Figure 3:
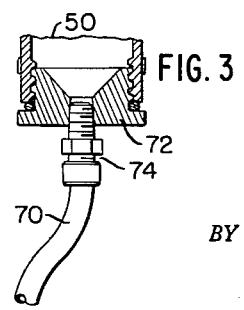
FIG. 3 is a longitudinal section through the bottom of the device showing alternative means for withdrawing the filtrate from the device.

In FIG. 3 is shown an alternative drainage system which may be utilized where the sample is collected in a remote location, as in a larger container resting on the ground and connected to the shell 50 by a flexible tube 70. The bottom of the shell 50 is closed by an adapter 72 having a funnel-shaped inner surface leading to a threaded opening to which the tube 70 is connected by a threaded connector 74.

From the foregoing description it will be seen that the sampling device of this invention greatly facilitates the sampling of fluids having solid particle contamination, in avoiding exposure of the sample to extraneous sources of contamination and in providing for the immediate separation, collection and storage of the solid contaminants.

The housing is conveniently formed of metal, such as stainless steel or Monel, and the inlet conduit 14 is preferably of flexible tubing, such as Teflon (polytetrafluoroethylene) covered with a braided metal covering. The connection 4 and fitting 18 are standard quick coupling connections and preferably include a valve within the connection 4 which is opened by the fitting 18. One suitable type of coupling is the ball chuck type illustrated, such as that sold under the trademark "Snaptite." Protective caps supendeds on ball chain are included to provide a covering for the coupling members when not in use.

Having thus disclosed my invention, I claim and desire to secure by Letters Patent:

1. A sampling device for filtering solids from a quantity of fluid comprising a filtration unit and a housing therefor; said filtration unit having a bottom member formed with a drainage port and a close fitting cover member formed with an inlet port and containing a microporous filter film arranged for filtration between said inlet port and outlet port; said housing comprising a shell having an open top portion adapted to receive said filtration unit and a lower drainage portion, means for connecting said drainage portion to a receptacle, a partition separating said top portion and drainage portion and having an opening extending through said partition, a vent from said drainage portion opening at the outside of said housing, a removable cap closing said upper portion and holding said filtration unit in assembled relation, including threaded means holding the cap and upper portion tightly together, said cap having an inlet conduit for introducing fluid into said filtration unit, said conduit terminating in a projection connecting with said inlet port, and a resilient gasket surrounding said projection and forming a pressure tight seal with said inlet port.

2. A sampling device for filtering solids from a quantity of fluid comprising a filtration unit and a housing therefor; said filtration unit having a bottom member formed with a drainage port and a close fitting cover member formed with an inlet port and containing a microporous filter film arranged for filtration between said inlet port and outlet port; said housing comprising a shell having an open top portion adapted to receive said filtration unit and a lower drainage portion, means for connecting said drainage portion to a receptacle to permit the drawing of a partial vacuum in said drainage portion, a partition separating said top portion and drainage portion and having an opening extending through said partition, a channel within said partition opening at one end in the outside wall of said shell and opening at the other end at the lower side of said partition; and a removable cap closing said upper portion and holding said filtration unit in assembled relation, including threaded means holding the cap and upper portion tightly together, said cap having an inlet conduit for introducing fluid into said filtration dish, said conduit connecting with said inlet port.

3. A sampling device for filtering solids from a quantity of fluid comprising a filtration unit and a housing therefor; said filtration unit having a bottom member formed with a drainage port and a close fitting cover member formed with an inlet port and containing a microporous filter film arranged for filtration between said inlet port and outlet port; said housing comprising a shell having an open top portion adapted to receive said filtration unit and a lower drainage portion, means for connecting said drainage portion to a receptacle to permit the drawing of a partial vacuum in said drainage portion, a partition separating said top portion and drainage portion and having an opening extending through said partition defined at the upper side by a raised flange projecting into said top portion and connecting with said drainage port and defined at the lower side by a lower flange projecting into said drainage portion, a channel within said partition opening at one end in the outside wall of said shell and opening at the other end at the lower side of said partition adjacent said lower flange; and a removable cap closing said upper portion and holding said filtration unit in assembled relation, including threaded means holding the cap and upper portion tightly together, said cap having an inlet conduit for introducing fluid into said filtration unit, said conduit terminating in a projection connecting with said inlet port.

4. A sampling device for filtering solids from a quantity of fluid comprising a filtration unit and a housing therefor; said filtration unit having a bottom member formed with a drainage port and a close fitting cover member formed with an inlet port and containing a microporous filter film arranged for filtration between said inlet port and outlet port; said housing comprising a shell having an open top portion adapted to receive said filtration unit and a lower drainage portion, means for connecting said drainage portion to a receptacle, a partition separating said top portion and drainage portion and having an opening extending through said partition defined at the upper side by a raised flange projecting into said top portion and connecting with said drainage port and defined at the lower side by a lower flange projecting into said drainage portion, a channel within said partition opening at one end in the outside wall of said shell and opening at the other end at the lower side of said partition adjacent said lower flange; and a removable cap closing said upper portion and holding said filtration unit in assembled relation, including threaded means holding the cap and upper portion tightly together, said cap having an inlet conduit for introducing fluid into said filtration unit, said conduit connecting with said inlet port.

5. A sampling device for filtering solids from a quantity of fluid comprising a filtration unit and a housing therefor; said filtration unit having a bottom member formed with a drainage port and a close fitting cover member formed with an inlet port and containing a microporous filter film arranged for filtration between said inlet port and outlet port; said housing comprising a shell having an open top portion adapted to receive said filtration unit and a lower drainage portion, means for connecting said drainage portion to a receptable to permit the drawing of a partial vacuum in said drainage portion, a partition separating said top portion and drainage portion and having an opening extending through said partition defined at the upper side by a raised flange projecting into said top portion and connecting with said drainage port and defined at the lower side by a lower flange projecting into said drainage portion, a channel within said partition opening at one end in the outside wall of said shell and opening at the other end at the lower side of said partition adjacent said lower flange; a removable cap closing said upper portion and holding said filtration unit in assembled relation, including threaded means holding the cap and upper portion tightly together, said cap having an inlet conduit for introducing fluid into said filtration unit, said conduit terminating in a projection connecting with said inlet port, and a resilient gasket surrounding said projection and forming a pressure tight seal with said inlet port.

References Cited in the file of this patent

UNITED STATES PATENTS

| | | |
|---|---|---|
| 65,515 | Spencer | June 4, 1867 |
| 991,215 | Kuhajda | May 2, 1911 |
| 2,879,207 | Poitras | Mar. 20, 1959 |

FOREIGN PATENTS

| | | |
|---|---|---|
| 1,066,973 | Germany | Oct. 15, 1959 |